United States Patent [19]

Mills, Jr.

[11] 4,209,694
[45] Jun. 24, 1980

[54] ASSAYING FOR URANIUM-BEARING ORE

[75] Inventor: William R. Mills, Jr., Duncanville, Tex.

[73] Assignee: Mobil Oil Corporation, New York, N.Y.

[21] Appl. No.: 948,843

[22] Filed: Oct. 5, 1978

Related U.S. Application Data

[63] Continuation-in-part of Ser. No. 868,948, Jan. 12, 1978, which is a continuation-in-part of Ser. No. 759,929, Jan. 17, 1977, abandoned.

[51] Int. Cl.² .............................................. G01V 5/00
[52] U.S. Cl. ..................................... 250/265; 250/269
[58] Field of Search ............... 250/262, 264, 265, 266, 250/269, 390

[56] References Cited

U.S. PATENT DOCUMENTS

| | | | |
|---|---|---|---|
| 2,920,204 | 1/1960 | Youmans | 250/265 |
| 3,385,969 | 5/1968 | Nelligan | 250/265 |
| 3,686,503 | 8/1972 | Givens et al. | 250/269 |

Primary Examiner—Alfred E. Smith
Assistant Examiner—Janice A. Howell
Attorney, Agent, or Firm—C. A. Huggett; William D. Jackson

[57] ABSTRACT

A technique is provided for assaying the formations surrounding a borehole for uranium-bearing ore. A borehole logging tool employs a pulsed neutron source to cyclically irradiate the formations with neutrons. The tool measures neutron fluxes produced during the period of time that prompt neutrons are being produced by the neutron fission of uranium in the formations. The tool also measures the total neutron fluxes produced in response to each burst of the neutron source, such measurements being utilized to correct the neutron flux response of the borehole logging tool during the prompt fission neutron period for the effects of epithermal/thermal neutron moderation, scattering, and absorption within the borehole itself.

16 Claims, 7 Drawing Figures

FIG. 2
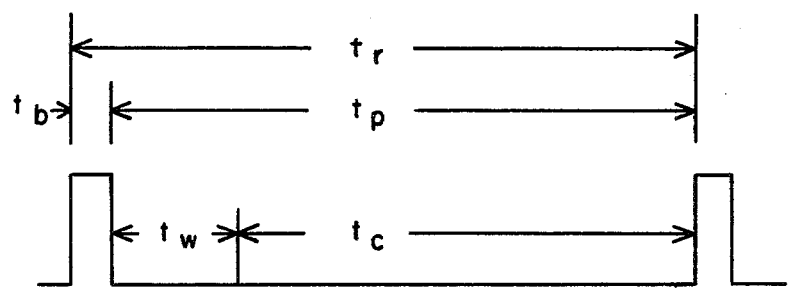
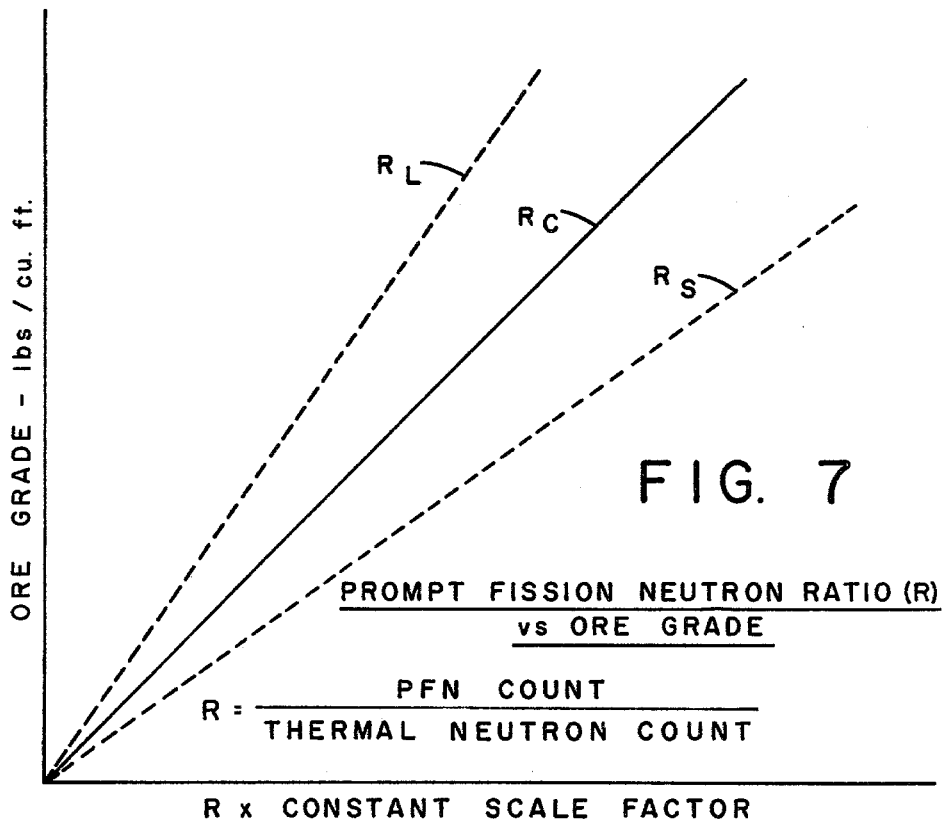
FIG. 7
PROMPT FISSION NEUTRON RATIO (R) vs ORE GRADE
$$R = \frac{\text{PFN COUNT}}{\text{THERMAL NEUTRON COUNT}}$$

ASSAYING FOR URANIUM-BEARING ORE

CROSS REFERENCES TO RELATED APPLICATIONS

This application is a continuation-in-part of U.S. patent application Ser. No. 868,948 filed Jan. 12, 1978, which in turn is a continuation-in-part of U.S. patent application Ser. No. 759,929 filed Jan. 17, 1977 (now abandoned).

BACKGROUND OF THE INVENTION

This invention relates to a radioactive logging technique and more particularly to a prompt fission neutron assaying technique.

When a formation containing a uranium-bearing ore is irradiated with fast neutrons, the ore nuclei react to neutron bombardment by breaking into smaller nuclear fractions which are normally referred to as fission products. This fission is attended by the emission of prompt neutrons immediately upon occurrence of the fission reaction and also by the emission of delayed neutrons by the fission products subsequent to the fission reaction. The prompt fission neutrons are emitted at the time of the fission reaction, while the delayed neutrons are emitted by the fission products for an appreciable length of time following the fission reaction.

The use of fast neutron irradiation for the detection of uranium has also been explored in a paper by Jan A. Czubek, "Pulsed Neutron Method for Uranium Well Logging," GEOPHYSICS, Vol. 37, No. 1, Feb. 1972, pp. 160-173. Czubek examines several phenomena associated with fast neutron irradiation of uranium-bearing formations and concludes that three can be employed to advantage in uranium detection techniques. Those which Czubek proposes for use as uranium content indicators are (1) epithermal neutron intensity resulting from prompt thermal neutron fission of uranium 235, (2) delayed thermal neutron intensity from prompt thermal neutron fission of uranium 235, and (3) delayed thermal neutron intensity from fast neutron fission of uranium 238.

In U.S. Pat. No. 3,686,503 to Givens et al. there is disclosed a borehole logging system for characterizing the uranium content of natural earth formations on the basis of measurements of delayed neutrons resulting from neutron fission of uranium. This patent discloses a subsurface assaying operation which is carried out by locating in a borehole adjacent a formation of interest a logging tool which includes a source of fast neutrons and a thermal neutron detector. The formation is irradiated with repetitive bursts of fast neutrons; and, subsequent to each burst and after dissipation of the original source neutrons, delayed neutrons resulting from neutron fission of uranium are detected. The output from the detector is then recorded in order to obtain a log indicative of the uranium content of the formation.

In co-pending U.S. patent application Ser. No. 868,948 filed Jan. 12, 1978, by Wyatt W. Givens and William R. Mills, Jr., entitled LOGGING TECHNIQUE FOR ASSAYING FOR URANIUM IN EARTH FORMATIONS, there is disclosed a borehole logging system employing the prompt fission neutron (PFN) uranium assaying technique. Both epithermal and thermal neutron fluxes resulting from the cyclical irradiation of a formation with bursts of fast neutrons are measured. These neutron fluxes are measured during the time period within each cycle of operation when prompt neutrons resulting from the thermal fission of uranium 235 are expected. The ratio of the epithermal neutron flux measurement to the thermal neutron flux measurement is proportional to the uranium 235 concentration for a fixed borehole diameter and borehole fluid, provided the epithermal and thermal neutron flux detectors have the same spacing with respect to the neutron source and further provided that the neutron fluxes detected by these detectors are measured during the same time period. Anything affecting the thermal neutron flux in the formation also effects the epithermal neutron flux as a measurement of prompt thermal fission neutrons from uranium 235 in the same manner. Therefore, the ratio of the responses of the PFN logging tool to epithermal and thermal neutron fluxes is independent of variations in the neutron generator output and of variations in the formation parameters of porosity, density, and thermal neutron macroscopic absorption cross section. However, the actual epithermal neutron flux to thermal neutron flux ratio measured in the borehole with the PFN logging tool remains dependent upon the variable borehole parameters such as borehole diameter, borehole fluid, and borehole casing.

SUMMARY OF THE INVENTION

In accordance with the present invention, there is disclosed a new and improved method and system for logging the formations surrounding a borehole for uranium-bearing ore.

More particularly, a prompt fission neutron logging tool is utilized to measure both epithermal and thermal neutron fluxes at equally spaced distances from a pulsed neutron source during the time periods that prompt neutrons are being produced from uranium-bearing ore in the surrounding formation. To correct such epithermal and thermal neutron flux responses of the logging tool for the effects of epithermal/thermal neutron moderation, scattering, and absorption characteristics of the borehole itself, the logging tool is first lowered into a calibration model containing a known concentration of a uranium-bearing ore and is cyclically operated to irradiate the model with bursts of fast neutrons. Two ratio measurements are carried out in the calibration model. Firstly, the ratio of epithermal to thermal neutron fluxes produced by the model in response to each cyclical burst of neutrons is measured. Secondly, the ratio of epithermal to thermal neutron fluxes is measured during the time period following each cyclical burst that prompt fission neutrons are being produced by the model. The logging tool is then operated in a field borehole an unknown concentration of uranium-bearing ore in the surrounding formations and the same two ratio measurements again made as were made in the calibration model. These four ratio measurements of epithermal to thermal neutron fluxes can then be compared to give a measure of the ore concentration in the formations surrounding the field borehole, corrected for borehole effects.

BRIEF DESCRIPTION OF THE DRAWINGS

FIG. 2 is a timing diagram representative of the cyclical operation of the PFN tool of FIG. 1.

FIG. 7 illustrates the behavior of the PFN ratio R by means of an experimentally determined calibration curve $R_C$ and two hypothetical curves $R_L$ and $R_S$.

DESCRIPTION OF THE PREFERRED EMBODIMENT

The present invention is particularly suitable for use in correcting borehole PFN logging measurements for the variable borehole parameters such as diameter, fluid, and casing. Before describing such invention in detail, there will first be described a PFN logging tool and recording system with which the technique of the invention may be preferably utilized.

Figure 1:
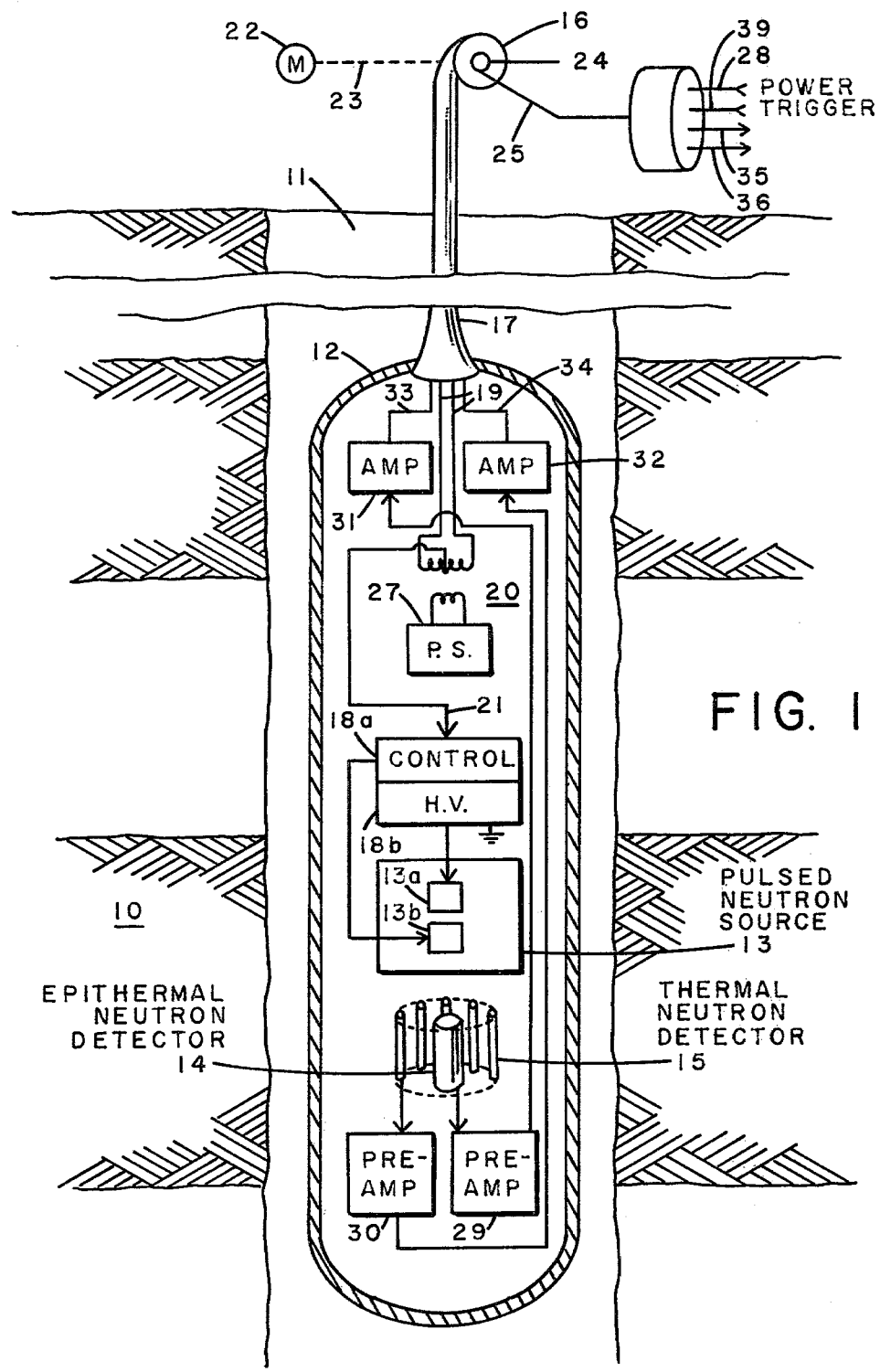
FIG. 1 illustrates a prompt fission neutron (PFN) logging tool for carrying out the present invention.

Referring now to FIG. 1, a formation to be investigated or assayed for uranium-bearing ore content is shown at 10. It is traversed by a borehole 11. Of interest is a determination of whether uranium-bearing ore is present in the formation and, if so, a quantitative measure of the ore grade. The formation may have been initially found from the relatively high count rate on a natural gamma-ray log previously obtained in the borehole. Assaying is carried out by lowering the PFN logging tool 12 into the borehole to the level of the formation 10. The PFN logging tool 12 is suspended in the borehole 11 by means of a logging cable 17. In one embodiment, the tool includes a neutron source 13 that is preferably an accelerator-type, 14-MEV source which comprises a neutron generator tube. Pulsing of the neutron generator tube is carried out in response to a trigger pulse supplied by the uphole system. The output of the neutron generator tube is a burst of fast neutrons spaced in time for irradiation of the formation 10.

As noted in the aforementioned patent to Givens et al, delayed fission neutrons from the fission reaction of an ore are measured after the original source neutrons have dissipated, which is in the order of a few milliseconds. However, prompt fission neutrons are produced within microseconds after the neutron burst from the source of fast neutrons.

To carry out this measurement of prompt fission neutrons within microseconds after each neutron burst, there is provided an epithermal neutron detector 14 and a thermal neutron detector 15. In the preferred embodiment as illustrated in FIG. 1, the source 13 is operated between 304 and 10,000 bursts per second, each burst having a duration of about 5 to 100 microseconds as shown by the period $t_b$ of FIG. 2. At a preferable burst rate of 1,000 burst per second, the neutron output of the source 13 will be in the order of $10^8$ neutrons per second. A waiting period $t_w$ of FIG. 2 follows each neutron burst to allow the 14-MEV neutrons from the source to moderate to the thermal energy level of about 0.025 EV. A sufficient waiting time period $t_w$ has been found to be about 50 to 100 microseconds. During the remaining time period $t_c$ of FIG. 2 before the next neutron burst, the number of neutrons detected by the epithermal neutron detector 14 and the thermal neutron detector 15 is counted by the uphole system. The uphole system is gated so as to count the detected neutrons during the 800- to 945-microsecond counting period $t_c$ following each waiting time period $t_w$. More details of this cyclical activation of the borehole logging tool and the counting of neutrons detected during the $t_c$ counting period of each cycle will now be described.

The PFN logging tool 12 comprises a steel, aluminum, or other suitable housing supported by the cable 17. This cable is driven from the drum 16 by the motor 22 and the connection 23. Slip rings 24 and brushes 25 are employed to couple the conductors of cable 17 to the uphole recording system for the transmission of signals and voltages. Trigger pulses (generated by the time base generator 40 of FIG. 3) are periodically applied by way of conductors 39, slip rings 24, brushes 25, cable conductors 19, and downhole transformer 20 to actuate the control unit 18a for the production of high-voltage pulses required to cyclically activate the neutron source 13. In the preferred embodiment, this neutron source is an accelerator-type employing a neutron generator tube having a target and an ion source. A neutron source of this type is manufactured by Kaman Sciences Corporation of Colorado Springs, Colorado. The high-voltage supply 18b provides high-voltage D.C., preferably 80 to 150 kilovolts at about 100 microamps, to the target 13a of the neutron source. The control unit 18a, in response to the trigger pulses from the uphole time base generator 40, applies high-voltage pulses to the ion source 13b, preferably in the range of 1,000 pulses per second. These pulses are of about 3 kilovolts in amplitude and 5 to 100 microseconds' duration. This provides a $10^8$-neutron/second output from the neutron source. A preferable trigger pulse rate is 1,000 pulses per second.

Power for the remaining electronics of the logging tool is supplied by the downhole power source 27. Power to this downhole source is supplied from the uphole power source 26 of FIG. 3 by way of conductors 28, slip rings 24, brushes 25, cable conductors 19, and downhole transformer 20. For simplicity, connection is not shown between the downhole power source 27 and the other downhole electronics such as the preamplifiers 29 and 30 and the amplifiers 31 and 32.

The neutron detectors 14 and 15 are concentrically mounted (by support structure not shown) with respect to each other about an axis parallel to the borehole wall so as to be equally sensitive to the epithermal and thermal neutron die-away measurements of the formation surrounding the borehole. The epithermal neutron detector 14 preferably is a helium-3 detector in cylindrical form covered with a shield that absorbs thermal neutrons, such as, for example, cadmium. The thermal neutron detector 15 preferably is a plurality of helium-3 detectors concentrically spaced about the epithermal neutron detector 14, with their outputs joined together.

Figure 3:
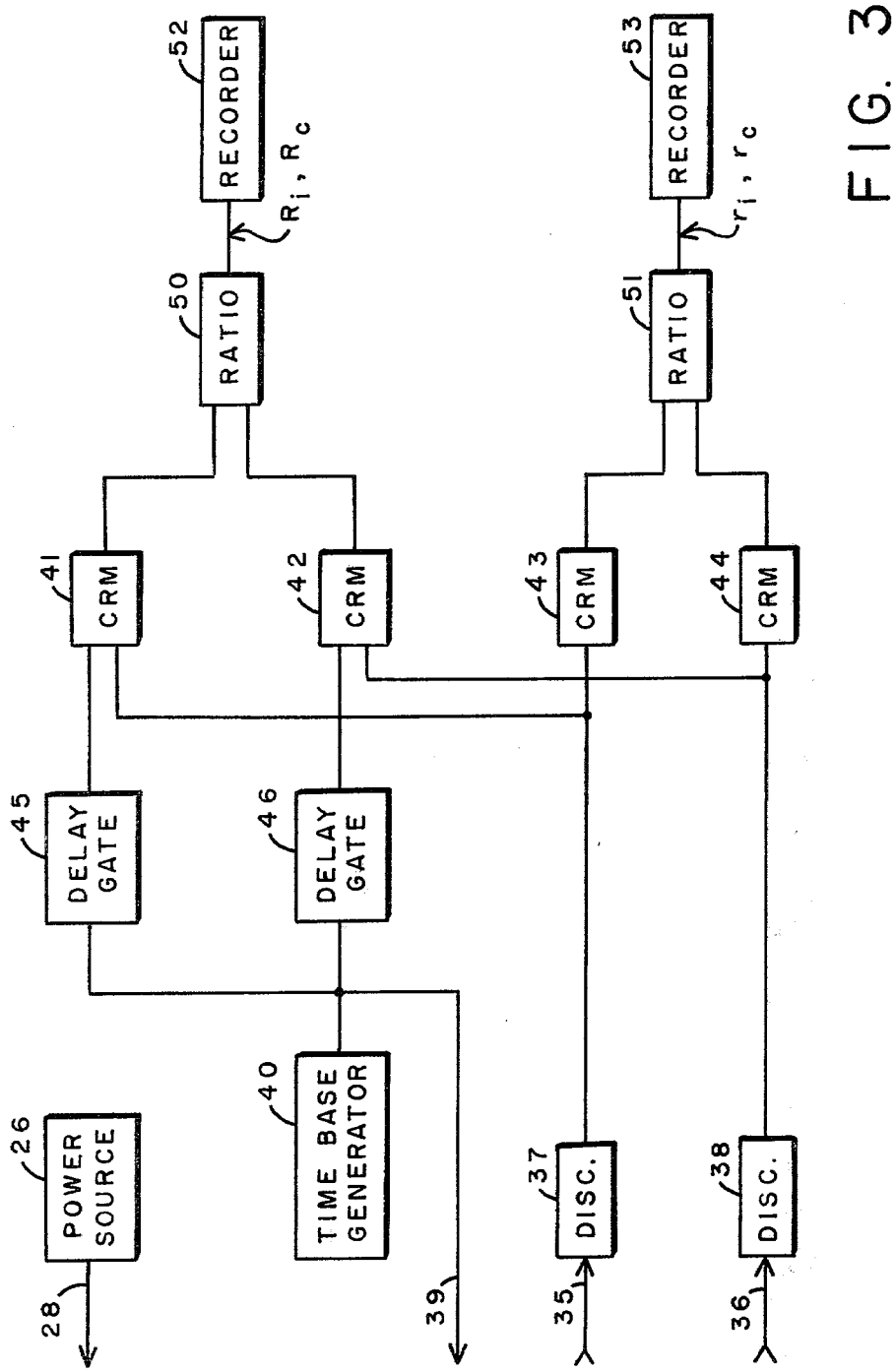
FIG. 3 illustrates the uphole recording system for carrying out the present invention.

The outputs from neutron detectors 14 and 15 are applied by way of the preamplifiers 29 and 30, amplifiers 31 and 32, cable conductors 33 and 34, and uphole conductors 35 and 36 to the pulse height discriminators 37 and 38 of FIG. 3.

Referring now to FIG. 3, the pulse height discriminator 37 is adjusted to pass to the count rate meter 41 those pulses produced by epithermal neutrons detected by the epithermal neutron detector 14. Pulse height discriminator 38 is adjusted to pass to the count rate meter 42 those pulses produced by thermal neutrons detected by the thermal neutron detector 15. Trigger pulses from the time base generator 40 are applied to delay and gate generators 45 and 46, both of which produce gating pulses for the duration of the desired prompt fission thermal neutron counting period $t_c$, this period preferably beginning about 50 to 100 microseconds after each neutron burst and extending until the beginning of the next neutron burst as illustrated in the example of the preferred embodiment of FIG. 2.

These gating pulses are applied to the count rate meters 41 and 42 for enabling the counting of epithermal and thermal neutrons, respectively, during the preferred counting period $t_c$.

The epithermal neutron count fed to count rate meter 41 during each count period $t_c$ is a measure of the prompt thermal fission neutrons produced by thermal neutron fission of the uranium-bearing ore. The thermal neutron flux in the formation is the source of the fission process. Anything affecting this thermal neutron flux also affects the epithermal neutron count as a measurement of prompt thermal fission neutrons. To correct the epithermal neutron count for the effects on the thermal neutron flux of bulk density, slowing-down time, and thermal neutron lifetime (directly related to the thermal neutron macroscopic absorption cross section $\Sigma_a$ of the formation), there is utilized a ratio detector 50 to divide the epithermal neutron count from count rate meter 41 by the thermal neutron count from the count rate meter 42.

Figure 4:
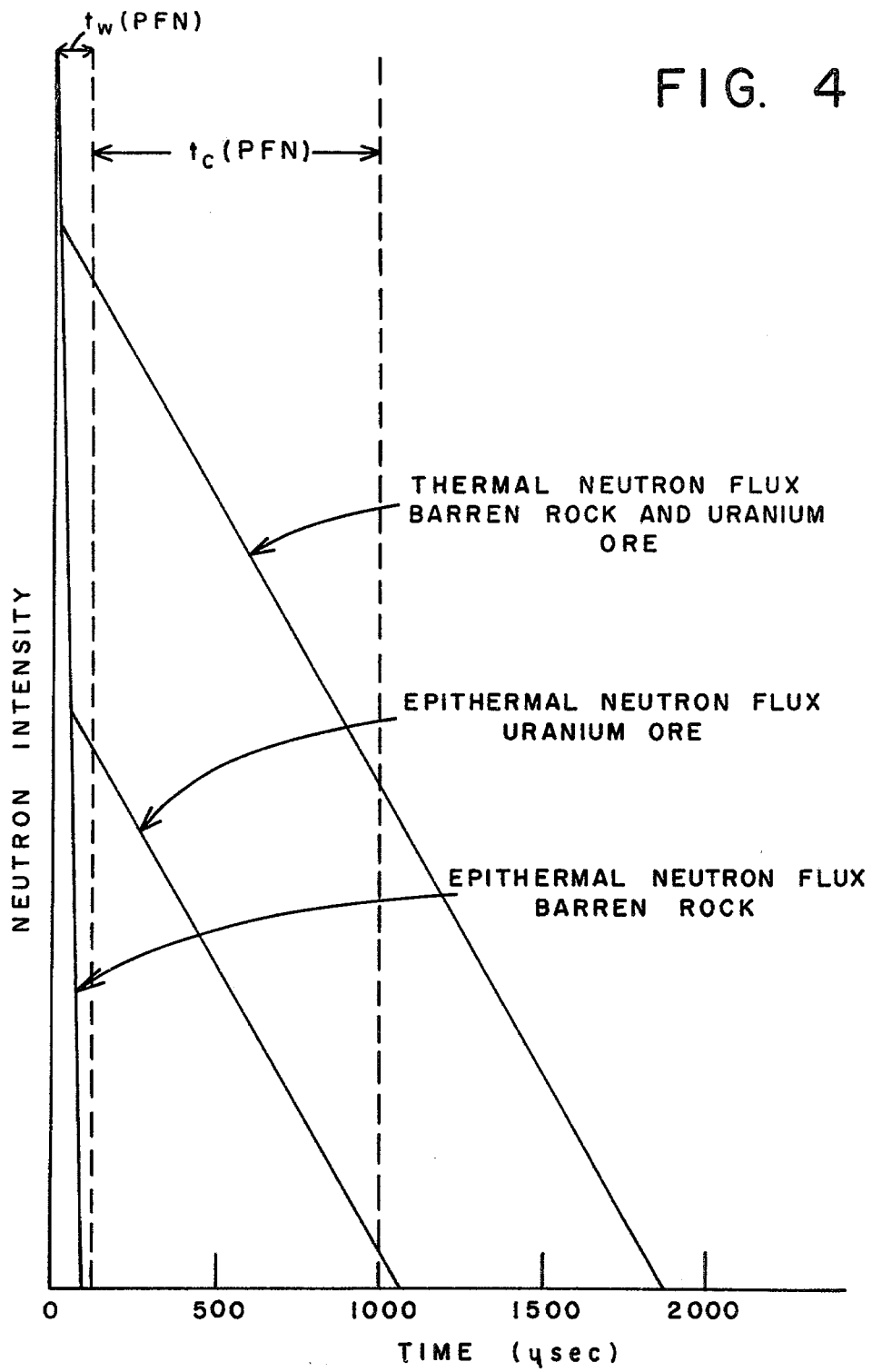
FIG. 4 illustrates characteristics of example subsurface formations as might be encountered when logging with the PFN tool of FIG. 1.

FIG. 4 illustrates the epithermal and thermal neutron fluxes as a function of time for a uranium-bearing ore formation and a barren formation, where both the ore-bearing and barren formations have the same macroscopic absorption cross section. The die-away rates measured by the epithermal and thermal neutron detector systems will be the same, provided the detector systems are properly located with respect to the neutron source. For this condition, i.e., both detector systems measuring the same die-away rate, the division of the epithermal neutron count or count rate by the thermal neutron count or count rate is represented by the following relationship:

$$(C_{epi}/C_{ther}) = KN_U \quad (1)$$

where, $N_U$ = number of uranium atoms per cubic centimeter, provided both the thermal and epithermal neutron detector systems measure the same die-away rate and further provided that the thermal and epithermal neutron count rate meters are gated to count neutrons during the same counting period $t_c$. K is a constant term representing the ratio of the epithermal and thermal neutron detector efficiencies times the uranium fission cross section. It can be seen that the ratio is zero for a barren formation and is directly proportional to the uranium concentration in an ore-bearing formation. Upon further calibrating the ratio detector 50 in accordance with the constant term K, an output is provided to recorder 52 representative of the uranium concentration in the formation.

As noted in the aforementioned co-pending U.S. patent application of Givens et al, the ratio of the responses of the PFN logging tool to epithermal and thermal neutrons is proportional to the uranium concentration in the formations surrounding a borehole even though formation parameters of porosity, density, and thermal neutron macroscopic absorption cross section may vary.

Figure 5:
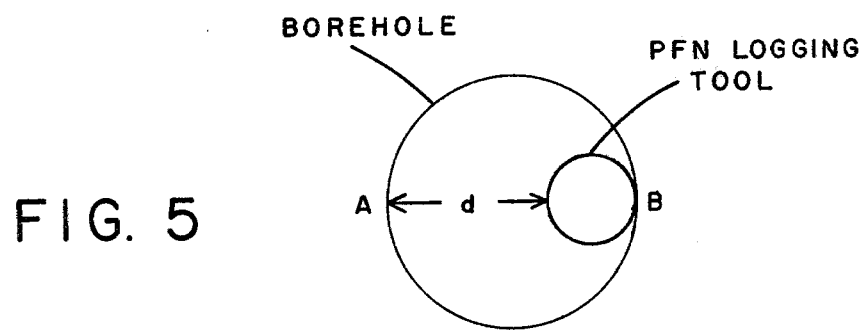
FIG. 5 illustrates a PFN logging tool resting against one side of the borehole.

Ideally, the use of the PFN logging tool of FIG. 1 having the same diameter as the borehole would maximize the response to the tool to epithermal and thermal neutrons. In actual operation, however, field boreholes are larger than the logging tool and, unless centralizing means is provided, the logging tool will rest against one side of the borehole as illustrated in FIG. 5. The epithermal neutron response of the logging tool to the formation on the same side of the borehole as the logging tool is greater than the response to the formation on the opposite side of the borehole. The epithermal PFN neutrons produced by uranium in the formation on such opposite side of the borehole must traverse the borehole itself before being detected and counted by the logging tool. The fluid within the borehole through which these epithermal neutrons must travel may be water or drilling mud, for example. These fluids contain a high concentration of hydrogen which is very effective in reducing the energy of epithermal neutrons to thermal energy. As illustrated in FIG. 5, a number of epithermal neutrons entering the borehole at point A are reduced to thermal energy before reaching the epithermal neutron detector in the PFN logging tool resting against the opposite side of the borehole at point B and, consequently, they do not contribute to the epithermal neutron count of the logging tool. The magnitude of the loss of epithermal neutrons due to a hydrogen-rich borehole fluid is strongly dependent upon the borehole diameter or, more particularly, upon the distance d from the PFN logging tool across the borehole to the point A. Thermal neutrons are also absorbed in the borehole fluid, but the loss of thermal neutrons by scattering and absorption is generally small compared to the loss of epithermal neutrons due to moderation to thermal energy. Other borehole properties such as diameter, cased, uncased, etc., also have epithermal/thermal neutron moderation, scattering, and absorption characteristics. Therefore, the resulting effect is that the ratio of the responses of the logging tool to thermal and epithermal neutrons is reduced as compared to the ideal case wherein the logging tool and the borehole are of the same size.

It is therefore a specific aspect of the present invention to provide for a PFN logging technique in which the measured responses of the PFN logging tool to epithermal and thermal neutrons are corrected for such epithermal/thermal neutron moderation, scattering, and absorption effects of the borehole. A correction of the response ratio can best be understood by referring to FIG. 7. The curve $R_C$ represents the actual PFN logging tool calibration as obtained in calibration models having identical borehole and matrix parameters except for uranium-bearing ore concentration. The response ratio R includes effects of the borehole parameters of diameter, fluid, casing, etc. To obtain the PFN logging tool ratio R corresponding to the uranium-bearing ore concentration in the formation, the ratio must be corrected for the effects of borehole parameter changes. As the borehole size becomes larger than the calibration borehole for a fixed uranium-bearing ore grade, more epithermal neutrons are moderated to thermal energies before reaching the PFN logging tool. Consequently, the response ratio R of the PFN logging tool in the larger borehole is decreased as represented by the $R_L$ curve in FIG. 7. Likewise, as the borehole size becomes smaller than the calibration borehole for a fixed uranium-bearing ore grade, the response ratio R is increased as represented by the $R_S$ curve in FIG. 7 due to more epithermal neutrons reaching the PFN logging tool.

This technique of the present invention employs the use of a correction factor for borehole effects obtained simultaneously with the prompt fission neutron measurements. Such correction factor results from a ratio of the total ungated epithermal neutron count to the total ungated thermal neutron count obtained during each cycle of the PFN logging operation as shown by the period $t_r$ of FIG. 2. This ungated count ratio is equivalent to that which would be obtained from a steady-state neutron source.

Such correction ratio is obtained by applying the ungated pulses from the pulse height discriminators 37 and 38 of FIG. 3 of the count rate meters 43 and 44. The voltage outputs of these count rate meters are applied to the correction ratio detector 51. The ungated epithermal neutron count is formed in the count rate meter 43, while the ungated thermal neutron count is formed in the count rate meter 44. Their ratio is determined by the correction ratio detector 51 and recorded on recorder 53.

Such correction ratio of ratio detector 51 may be used to correct the epithermal/thermal neutron count ratio of ratio detector 50 for the aforementioned borehole effects in the following manner:

$$R_c = R_i \times g(r_c/r_i) \qquad (2)$$

where, $r_c$ = ratio of the ungated epithermal neutron to thermal neutron responses of the PFN logging tool in a uranium calibration model and is singled valued, $r_i$ = ratio of the ungated epithermal neutron to thermal neutron responses of the PFN logging tool in the field borehole and is variable, $R_i$ = ratio of the gated epithermal neutron to thermal neutron responses to the PFN logging tool in the field borehole during the time period that prompt fission neutrons are produced, and $R_c$ = ratio of the gated epithermal neutron to thermal neutron responses of the PFN logging tool in the uranium calibration model during the time period that prompt fission neutrons are produced.

As can be seen in Equation (2), the response ratios $R_c$ and $r_c$ are obtained by operating the PFN logging tool in one or more calibration models having known uranium concentrations and identical borehole and matrix parameters before taking the PFN logging tool to the field.

Figure 6:
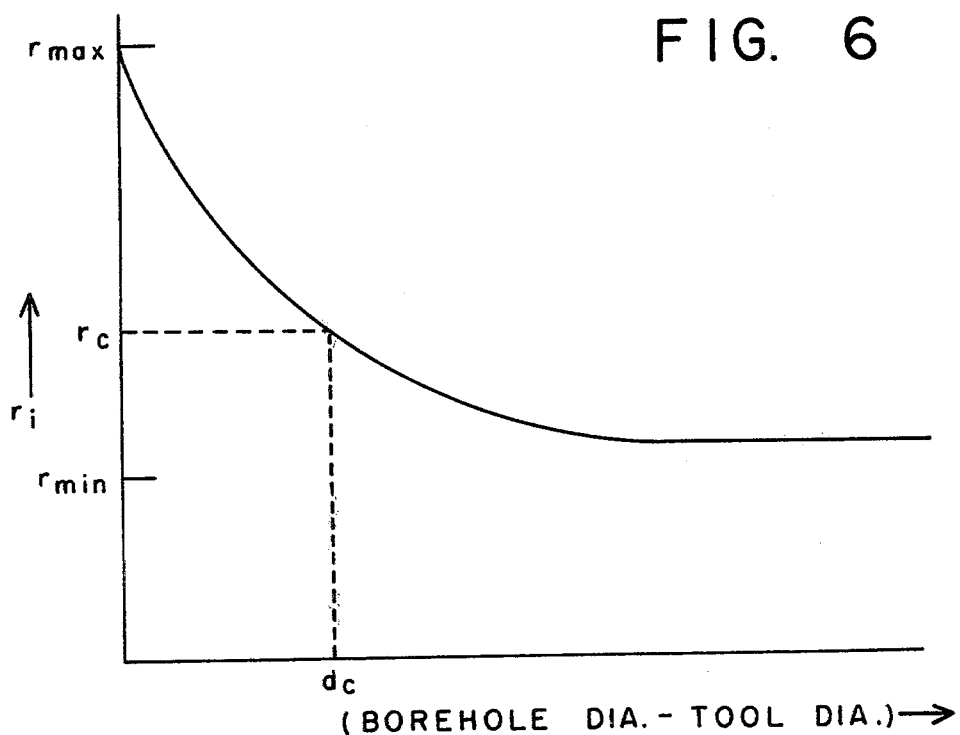
FIG. 6 illustrates the qualitative behavior of $r_i$, the ratio of epithermal to thermal neutron response from the PFN logging tool.

The function g of the ratio of the responses $r_c/r_i$ of the PFN logging tool can be used to correct the $R_c/R_i$ response ratio of the PFN logging tool for the differing epithermal/thermal neutron moderation, scattering, and absorption effects due to changes in borehole diameter, borehole fluid, etc., in the field. There will be one value for the ratio $r_c$ in the calibration model; however, the ratio $r_i$ will vary due to changing borehole parameters encountered in the field. Referring to FIG. 6, it can be seen that the ratio $r_i$ is equal to the ratio $r_c$ when the combination of borehole parameters, diameter, fluid, etc., are equivalent to those of the calibration model. As the field borehole becomes larger than the borehole of the calibration model, the ratio $r_i$ asymptotically approaches a minimum value $r_{min}$. As the field borehole becomes smaller than the borehole of the calibration model, the ratio $r_i$ approaches a maximum value $r_{max}$. This maximum value occurs when the field borehole is the same size as the diameter of the logging tool.

More particularly, the function g in the expression $g(r_c/r_i)$ of Equation (2) which is multiplied by the ratio of the gated responses $R_i$ of the PFN logging tool in the field borehole to yield a corrected ratio $R_c$ is determined experimentally. For example, values of $R_i$ can be measured with the PFN logging tool in a borehole that has been cored and the core assayed. The PFN logging tool is also run in these boreholes to obtain the corresponding values $r_i$. The functional form of $g(r_c/r_i)$ by which the values $R_i$ are multiplied to give values $R_c$ corresponding to the ore grades obtained by core analysis is determined by regression analysis. Once the form of $g(r_c/r_i)$ is established, then only values $R_i$ and $r_i$ need be measured in the field borehole to obtain the ore grade.

Ratio detectors 50 and 51 may be of a conventional type as disclosed on pages 338 and 339 in ELECTRONIC ANALOG COMPUTERS, Gravino A. Korn and Theresa M. Korn, McGraw-Hill Book Company, Inc., New York, 1956. It will be apparent to those skilled in the art that ratio detector 50 can be calibrated in terms of a constant K by the proper selection of feedback and biasing resistors to give uranium concentration in desired units of lbs/ft$^3$, kilograms/meter$^3$, etc. The constant is determined by measuring the ratio of the two detectors' efficiencies over a range of uranium concentrations as illustrated by the experimentally determined calibration curve $R_C$ in FIG. 7.

In the foregoing-described preferred embodiment, the ungated epithermal and thermal neutron responses, $r_c$ and $r_i$, are measured over the logging cycle time period of $t_r$ as shown in FIG. 2. In an alternative embodiment, these responses may be measured over the time period $t_p$ of each logging cycle which begins at the termination of each neutron burst of the pulsed neutron source 13 and ends at the initiation of the next succeeding neutron burst as also shown in FIG. 2. Such alternative embodiment would employ the gating of the epithermal and thermal neutron count rate meters 43 and 44 over the time period $t_p$ in similar manner to the gating of the epithermal and thermal neutron count rate meters 41 and 42 over the time period $t_c$ by means of delay gates 45 and 46, respectively.

Also, in the foregoing-described preferred embodiment, detector 15 is a thermal neutron detector utilized for measuring thermal neutron flux that represents predominantly the thermal neutron parameters of the formation being logged. In an alternative embodiment, this same thermal neutron flux measurement may be carried out by the use of a gamma-ray detector that measures the thermal neutron capture gamma rays emitted by the formation. It is therefore to be understood that within the scope of the appended claims, the measurement of thermal neutron flux representing predominantly the thermal neutron parameters of the formation may be carried out by either the detection of thermal neutrons or thermal neutron capture gamma rays.

I claim:

1. A method for assaying for uranium-bearing ore in the formations traversed by a borehole, comprising the steps of:
   (a) cyclically irradiating a known concentration of uranium-bearing ore with bursts of fast neutrons,
   (b) determining the ratio of epithermal to thermal neutron fluxes in said known concentration of ore in response to each irradiation of step (a),
   (c) determining the ratio of epithermal to thermal neutron fluxes during the time period that prompt fission neutrons are produced in said known concentration of ore in response to each irradiation of step (a), (d) cyclically irradiating an unknown concentration of uranium-bearing ore in the formations surrounding the borehole with bursts of fast neutrons, (e) determining the ratio of epithermal to thermal neutron fluxes in said unknown concentration of uranium-bearing ore in response to each irradiation of step (d), and (f) determining the ratio of epithermal to thermal neutron fluxes during the time period that prompt fission neutrons are produced in said unknown concentrations of uranium-bearing ore in response to each irradiation of step (d).

2. The method of claim 1 further including the step of comparing the ratios determined in steps (b), (c), (e), and (f) as an indication of the concentration of the uranium-bearing ore in the formations surrounding the borehole.

3. The method of claim 2 wherein the step of comparing the ratios of epithermal to thermal neutron fluxes is in accordance with the following relationship:

$$R_c = R_i \times g(r_c/r_i)$$

where, $r_c$ = ratio of the ungated epithermal to thermal neutron fluxes produced in said known concentration of uranium-bearing ore in response to each burst of fast neutrons, $r_i$ = ratio of the ungated epithermal to thermal neutron fluxes produced in the formations surrounding the borehole in response to each burst of fast neutrons, $R_i$ = ratio of epithermal to thermal neutron fluxes during the time period that prompt fission neutrons are produced in the formations surrounding the borehole in response to each burst of fast neutrons, $R_c$ = ratio of epithermal to thermal neutron fluxes during the time period that prompt fission neutrons are produced in said known concentration of uranium-bearing ore in response to each burst of fast neutrons, and $g$ = a function of the ratio of $(r_c/r_i)$ 4. The method of claim 3 wherein the function g is based upon the uranium-bearing ore concentration in the formations surrounding the borehole determined from core samples.

5. The method of claim 3 wherein the function g is based upon the uranium-bearing ore concentration in the formations surrounding the borehole determined from a delayed fission neutron assay logging operation.

6. The method of claim 1 wherein the thermal neutron fluxes are measured by a count of thermal neutrons.

7. The method of claim 1 wherein the thermal neutron fluxes are measured by a count of thermal neutron capture gamma rays.

8. The method of claim 1 wherein the ratios in steps (b) and (c) are determined during the time period beginning with the start of each burst of fast neutrons and ending with the start of the next succeeding burst of fast neutrons.

9. The method of claim 1 wherein the ratios in steps (b) and (c) are determined during the time period beginning immediately following each burst of fast neutrons and ending with the start of the next succeeding burst of fast neutrons.

10. A system for logging the formations traversed by a borehole for uranium-bearing ore, comprising:

(a) a borehole logging tool having a pulsed neutron source and epithermal and thermal neutron flux detectors equally spaced from said neutron source, (b) means for exposing a calibration model having a known concentration of uranium-bearing ore to said pulsed source of neutrons, (c) means for measuring a first response of said detectors to epithermal and thermal neutron fluxes produced by said known concentration of uranium-bearing ore in response to each burst of neutrons from said pulsed neutron source, (d) means for measuring a second response of said detectors to epithermal and thermal neutron fluxes produced during the time period following each burst of neutrons and in which prompt neutrons are being produced from neutron fission of uranium-bearing ore in said calibration model, (e) means for moving said logging tool through a borehole to expose the surrounding formations to said pulsed source of neutrons, (f) means for measuring a third response to said detectors to epithermal and thermal neutron fluxes produced by uranium-bearing ore in said formations in response to each burst of neutrons from said pulsed neutron source, and (g) means for measuring a fourth response of said detectors to epithermal and thermal neutron fluxes produced during the time period following each burst of neutrons and in which prompt neutrons are being produced from neutron fission of uranium-bearing ore in the formations surrounding the borehole.

11. The system of claim 10 further including means for comparing said first, second, third, and fourth responses of said detectors as an indication of the uranium-bearing ore concentration in the formations surrounding the borehole.

12. The system of claim 10 wherein said thermal neutron flux detector produces counts of the thermal neutrons arriving at said detector from the formations being logged.

13. The system of claim 10 wherein said thermal neutron flux detector produces counts of the thermal neutron capture gamma rays arriving at said detector from the formations being logged.

14. The system of claim 10 wherein the spacings of the epithermal and thermal neutron flux detectors from the pulsed neutron source are identical.

15. The system of claim 10 wherein each of said means for measuring the responses of said detectors comprises means for determining the ratio of the measured epithermal neutron flux to the measured thermal neutron flux.

16. The system of claim 10 wherein the means for measuring said first and third responses of said detectors is gated during the time period beginning immediately following each burst of neutrons and ending with the start of the next succeeding burst of neutrons.

* * * * *